United States Patent [19]

Gillner

[11] Patent Number: 4,816,096
[45] Date of Patent: Mar. 28, 1989

[54] PROCESS AND APPARATUS FOR PRODUCING LAMINATED GLASS

[75] Inventor: Manfred Gillner, Aachen, Fed. Rep. of Germany

[73] Assignee: Saint-Gobain Vitrage, Courbevoie, France

[21] Appl. No.: 53,739

[22] Filed: May 26, 1987

[30] Foreign Application Priority Data

May 26, 1986 [DE] Fed. Rep. of Germany ....... 3618065

[51] Int. Cl.$^4$ .................... B32B 31/08; B32B 31/12
[52] U.S. Cl. ................... 156/106; 156/306.6; 156/324; 156/547; 156/550; 156/551; 156/555
[58] Field of Search ............... 156/99, 106, 306.6, 156/324, 543, 547, 550, 551, 555

[56] References Cited

U.S. PATENT DOCUMENTS 3,654,039  4/1972  Bucher ........................ 156/99 X
4,683,172  7/1987  LeGrand et al. ............. 156/106 X Primary Examiner—Robert A. Dawson
Attorney, Agent, or Firm—Oblon, Fisher, Spivak, McClelland & Maier

[57] ABSTRACT

To produce panes of laminated glass from two sheets of silicate glass (1, 16) and from an interlayer thickness of a plastic film (8) glued to the two glass sheets (1, 16), the liquid adhesive material intended for the two adhesive layers (2, 17) is applied each time in the form of a coherent and uniform film of a definitive thickness of the upper surface of the glass sheets (1, 16) oriented horizontally. The plastic film (8) is glued to one of the glass sheets (1) provided with the adhesive layer (2). The glass sheet (1) provided with the glued plastic film (8) is turned over so that the glued plastic is oriented downward. The two glass sheets (1, 16) are then juxtaposed by their front edges (20 and 21) and are joined by calendering by means of a pair of cylinders (22, 23) while maintaining an entry opening angle $\alpha$ of 2° to 6°.

13 Claims, 5 Drawing Sheets

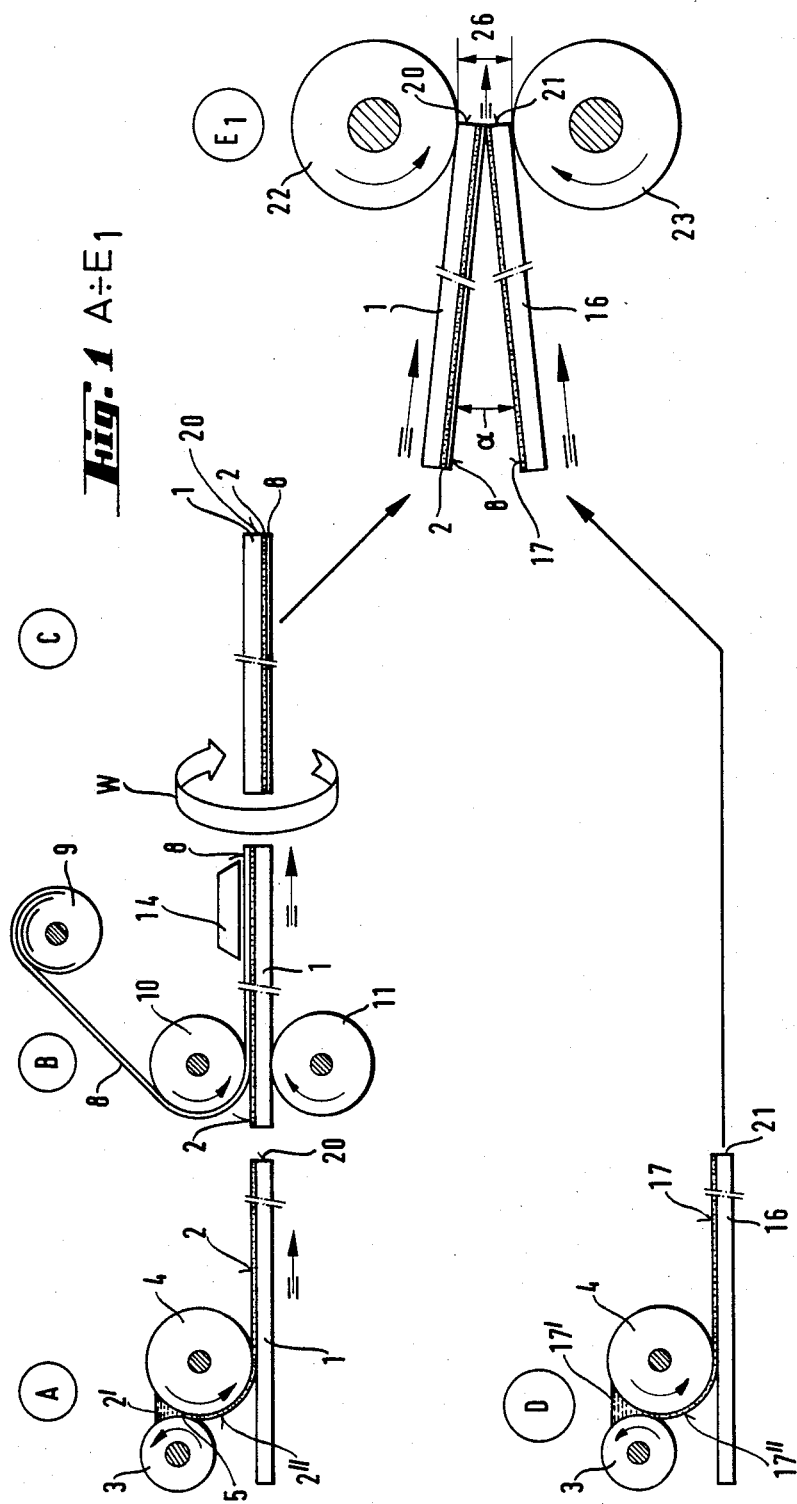

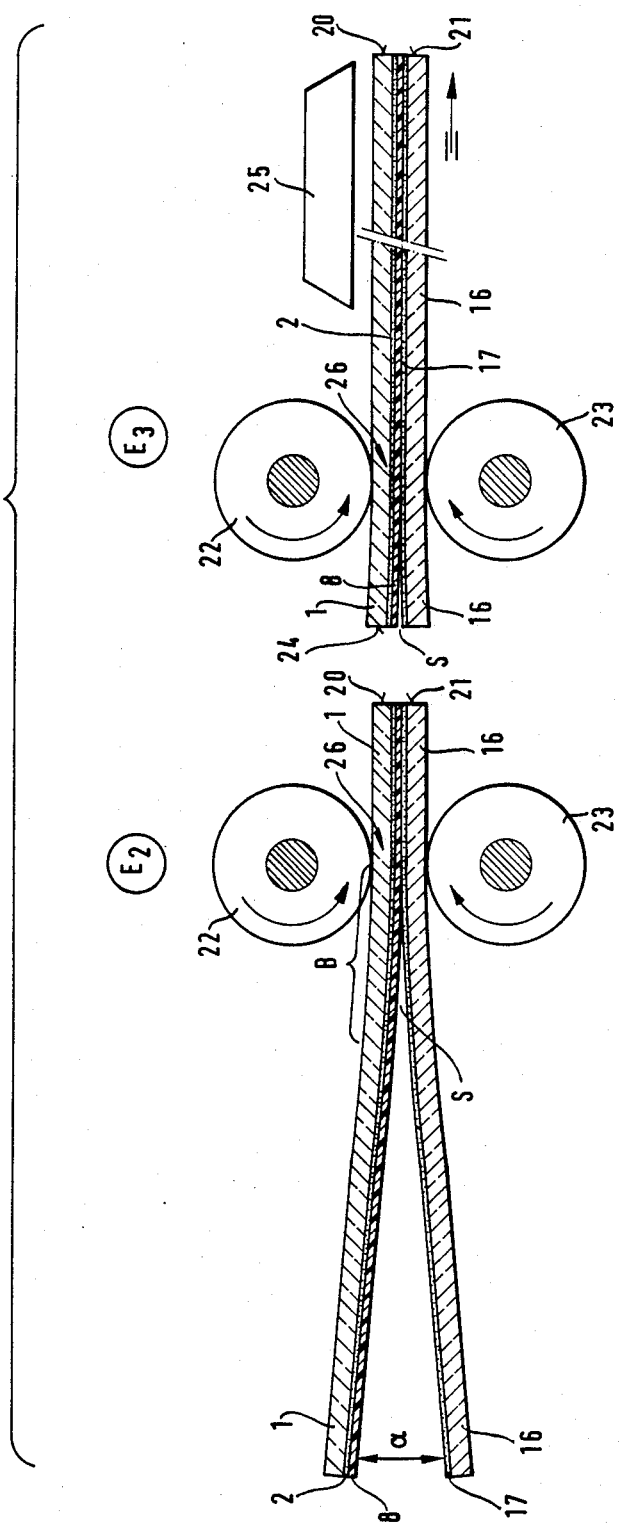
Fig. 1 $E_{2+3}$

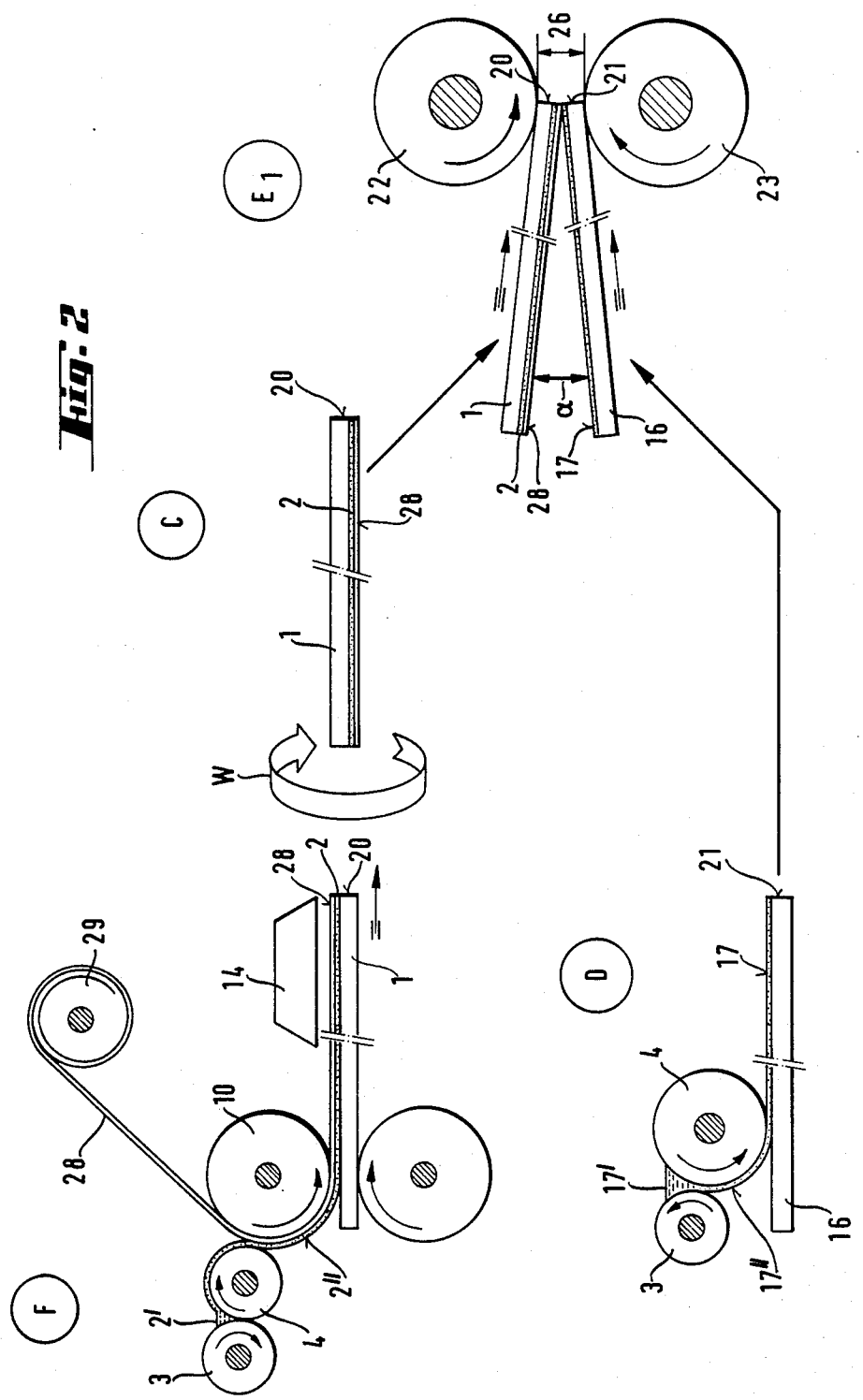

PROCESS AND APPARATUS FOR PRODUCING LAMINATED GLASS

BACKGROUND OF THE INVENTION

1. Field of the Invention

This invention relates to a process for producing laminated glass from at least two glass sheets and from an interlayer thickness of a plastic film glued to the two glass sheets, according to which the plastic film is joined by calendering to a glass sheet by a hardening adhesive material and this first glass sheet provided with the plastic film is joined by calendering to the second glass sheet also by a hardening adhesive material.

2. Related Art

In the case of the process now used generally to produce panes of laminated glass, the two glass sheets are joined by calendering to a thermoplastic film, in particular polyvinyl butyral, during a prejoining process, then they are subjected to a final pressing, hot and under pressure, in an autoclave. This process occurs in a discontinuous manner and relatively expensive pressure autoclaves are necessary for this purpose. Consequently, efforts have been made time and again to achieve processes for producing laminated glass which makes it possible to abandon the autoclave process. In a process of this type, the interlayer thickness of plastic has the form of a film which must be joined to the two glass sheets with layers of hardening adhesive applied in the liquid state.

A process of the type specified above is described in the document EU-A2 0 108 632. In this known process, the adhesive material is applied on the plastic film placed on a flat support using extrusion nozzles and in the form of strips spaced from one another. The first glass sheet is then set down on the plastic film covered with strips of adhesive material and the group of layers, consisting of the flat support, the plastic film covered with adhesive and the upper glass sheet, is subjected to a first calendering operation during which the plastic film is joined, without forming bubbles, to the overlying glass sheet. The formed laminate of the upper glass sheet and of the plastic film is then lifted from its support and is turned over so that the plastic film is oriented upward. Then the adhesive material, also in the form of strips, necessary to assure the joining to the second glass sheet is applied on the plastic film. On the thickness of plastic provided with adhesive material in the form of strips is then placed the second glass sheet which, during a second calendering operation, is joined without forming bubbles to the laminate comprising the glass and the plastic. To this is added the irradiation operation intended to cause the adhesive layers to harden.

In the case of another known process for producing laminated glass using liquid adhesive materials to assure the joining of the interlayer thickness of plastic material to the glass sheets, the adhesive material is applied in excess on the interlayer thickness already glued to the first glass sheet and the second glass sheet is placed on the adhesive material and is glued to the interlayer thickness by a massive calendering pressure, the second glass sheet being temporarily unglued from the interlayer thickness on the entry side of the cylinders by the adhesive material under the influence of the calendering pressure to eliminate the occluded air (DE-AS 27 37 740).

The particular difficulty in the production of laminated glass according to said process consists, during the joining by calendering of the rigid glass sheets, in preventing in a reliable way any occlusion of air. In the case of the known process, for this reason work is performed essentially with an excess of adhesive material, the excess adhesive material forming a bead between the rigid glass sheets, immediately upstream from the nip of the cylinders and being laterally expelled from between the glass sheets at the time of calendering. However, the excess adhesive material expelled laterally and at the back end of the glass sheets during calendering clogs the installation and complicates the process.

The invention has as its object to modify the process mentioned in the introduction so as to make possible a joining of the glass sheets without bubbles economically without clogging of the installation by the adhesive material coming out at the edges.

According to the invention, this object is achieved by the fact that the adhesive material for the two adhesive layers is applied each time in the form of a coherent, uniform film of a definitive or predetermined thickness and by the fact that the first glass sheet provided with the plastic film and the second glass sheet provided with the adhesive layer are joined by calendering by means of a pair of cylinders maintaining an entry opening angle of 2° to 6°.

The joining by calendering of the two glass sheets can essentially be performed in any position, to the extent that, using appropriate mechanical means, care is taken to maintain the necessary opening angle between the two glass sheets upstream from the nip of the cylinders. The two glass sheets are therefore introduced into the calendering nip in a flat state at this reciprocal angle, and during the calendering operation, upstream from the calendering nip, they are kept separate from one another so that said opening angle is obtained between them.

In a particularly advantageous embodiment of the invention, the process is conducted in such a way that, during the joining by calendering of the two glass sheets, the second glass sheet coated with adhesive and whose coated face is oriented upward, and the first glass sheet provided with the plastic film and whose layer of plastic is oriented downward, are introduced into the nip of the cylinders, at an orientation substantially horizontal and maintaining an entry opening angle of 2° to 6°.

The support necessary to maintain the opening angle can, in this case, be achieved in a particularly simple way by the fact that the upper glass sheet provided with the layer of plastic is supported by rollers and/or support elements in contact with the layer of plastic, while the lower glass sheet coated with adhesive material keeps its position by the intervention of its own weight.

The process according to the invention results, in a relatively simple way, in a product entirely free of bubbles without fear of a clogging of the conveying and calendering devices by the laterally expelled adhesive material.

The invention further relates to devices suitable for the implementation of the new process.

By the expression "glass sheets" is meant essentially silicate glass sheets. If applicable, one of the glass sheets, however, can also be made of a transparent plastic, for example a polycarbonate. In addition, the process according to the invention can also be used for the production of panes of glass sheets and/or which, in addition to two silicate glass sheets, comprise another layer or covering sheet of a transparent plastic. For simplicity, there will be described below only the production of a pane of laminated glass in its simplest form comprising two silicate glass sheets and an interlayer plastic film, but the invention however is not limited to this production.

BRIEF DESCRIPTION OF THE DRAWINGS

Advantageous embodiments and developments of the invention are the object of the claims and will come out from the following description of preferred examples of embodiments, given with reference to the accompanying drawings, in which:

FIG. 1 (composed of FIG. 1A÷E, and FIG. $1E_{2+3}$) is a diagrammatic view of a first embodiment for the process according to the invention;

FIG. 2 is also a diagrammatic view of a second embodiment for the process according to the invention;

DETAILED DESCRIPTION OF THE PREFERRED EMBODIMENTS

Figure 3:
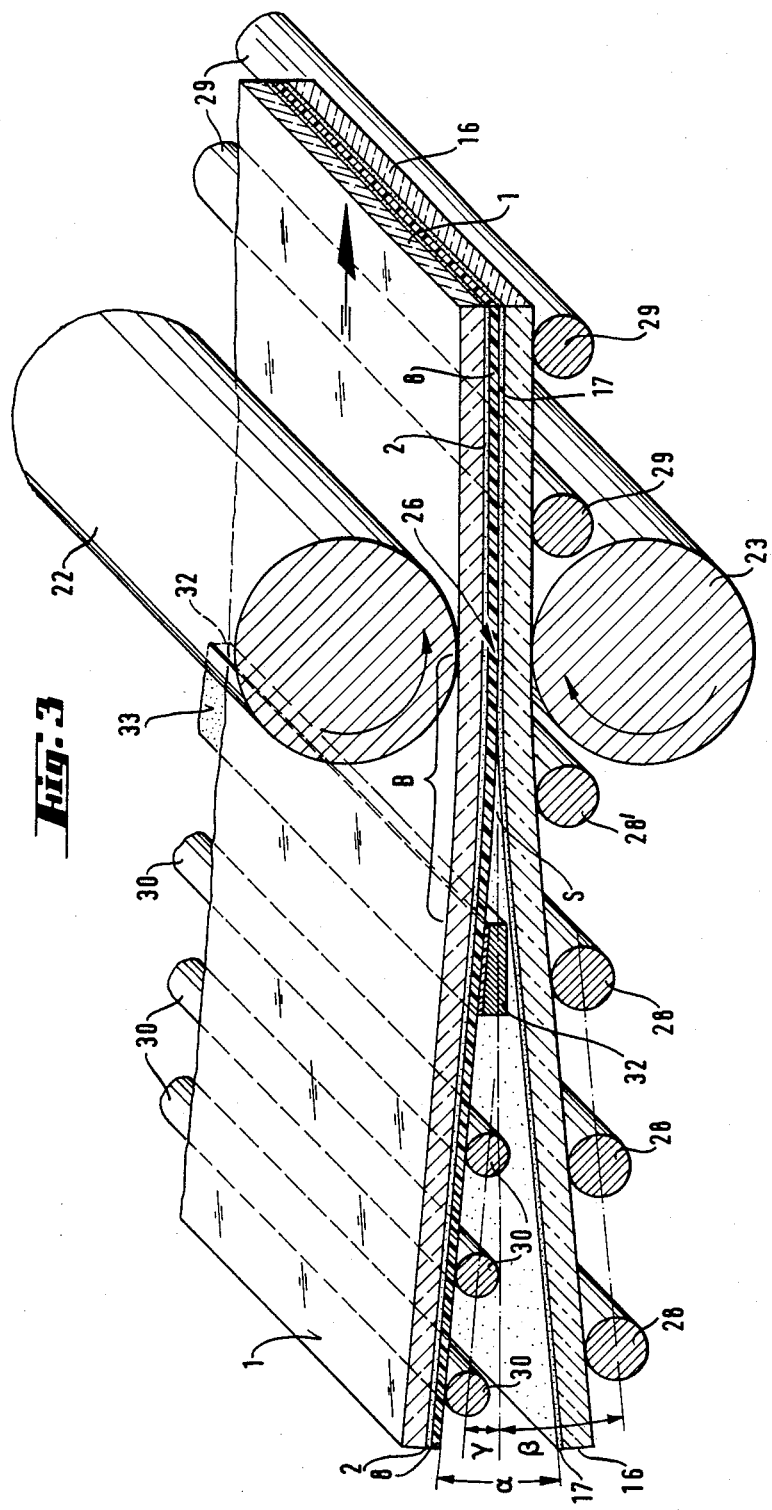
FIG. 3 is a fragmentary view in perspective of the basic structure of a device intended to join the glass sheets by calendering according to the process according to the invention.

Commercial laminated safety glass, which can be produced by means of the process according to the invention, consists, for example, of two silicate glass sheets each 3 to 4 mm thick and of an interlayer about 0.5 mm thick made of a plastic film. As interlayer, flexible films of polyvinyl chloride have proved particularly satisfactory, but films of other plastics can, of course, also be used, provided they possess the necessary properties and they can be glued to the surfaces of the glass.

As for the adhesive used, it should be an adhesive which hardens without release of gas. For example, for this purpose reaction glues can be used such as glues having two components which, because of the necessary absence of streaks after hardening, are applied in the form of very homogeneous mixtures of the reaction components on one of the surfaces to be joined.

Instead of that, in the case of a reaction glue having two components, one of the two components, can for example, be applied to one of the two surfaces to be joined and the other component can be applied to the other of the two surfaces to be joined so that the hardening reaction occurs with certainty only after the juxtaposition of the two layers to be joined.

Adhesive materials which harden under the action of UV rays have proved to be particularly satisfactory. These adhesive materials are described, for example, in the patent EU-PS No. 0 010 355 and in the German patent application No. P 35 23 140. In the case of the embodiment of process described below, adhesive materials with an acrylic resin base, as described in the latter mentioned German patent application, have been used with good success.

As FIG. 1 clearly shows, in step A of the process, adhesive material 2' is applied to glass sheet 1 at the rate of the quantity necessary for gluing, in the form of a thin and uniform coherent adhesive layer 2. The glue described in German patent application No. P 35 23 140 should, for example, be applied in a layer with a thickness of 20 to 50 μm and preferably of 25 to 40 μm, when a perfectly transparent gluing without bubbles of a flexible polyvinyl chloride film must be achieved without the adhesive material being laterally expelled during calendering.

The uniform application of the adhesive can be performed, for example, by known projection or spraying processes in which the adhesive material is applied in an amount regulated by means of an appropriate spraying nozzle. Roller coating machines have proved particularly advantageous and their work principle is illustrated diagrammatically in FIG. 1. Such a roller coating machine comprises two cylindrical rollers 3, 4 rotating in the same direction which are mounted to rotate beside one another and form a narrow nip 5. These two rollers 3, 4 form above nip 5 a hollow in the shape of a trough which widens toward the top and which contains a reserve of liquid adhesive material 2'. A thin uniform layer 2" is carried from adhesive reserve 2 by applicator roller 4 which rolls over glass sheet 1 to be coated and is applied on the surface of glass sheet 1 in the form of a uniform coherent layer 2. In the case of these roller coating machines, the thickness of the layer or the volume applied can be finely regulated by modification of the width of nip 5 of the rollers.

A flexible polyvinyl chloride film 8 about 0.5 mm thick is glued during the following step B of the process to glass sheet 1 thus coated with adhesive layer 2. Film 8 is unwound from a roller 9 mounted to rotate and is applied on adhesive layer 2 by means of a coating roller 10 opposite which is a support roller 11 intended to support glass sheet 1. The pressure of the pair of rollers 10, 11 is regulated in such a way that a complete impregnation, i.e. without gaps and without bubbles, of film 8 is obtained by means of adhesive layer 2. Viewed in the direction of conveying of glass sheet 1, behind the pair of rollers 10, 11 and above the glass sheet, is installed a UV radiation source 14 which extends over the entire width of glass sheet 1 and whose intensity of radiation is fixed so that adhesive layer 2 hardens at the given conveying speed. If applicable, it is not necessary, however, to harden the adhesive layer already at this stage of the process, but rather at a later stage, particularly after the final joining by calendering of the two glass sheets.

At the exit from the processing station which performs step B of the process, glass sheet 1 provided with film 8 is turned over (directional arrow W) so that it is oriented downward. It has been proved that glass sheet 1 coated by means of film 8 can be conveyed with the plastic film oriented downward either on a standard conveying path such as a roller conveyor, or a belt conveyor, without harming the process.

While the preparation is taking place of glass sheet 1 or, if applicable also, independently of this one in time, glass sheet 16, which represents the second simple glass sheet intended for the pane of laminated glass, is provided in step D of the process with a coherent adhesive layer 17 of uniform thickness also with a roller coating machine comprising a pair of rollers 3, 4 which contain adhesive material 17', in the state able to flow, in the hollow in the shape of a trough formed by the two rollers 3, 4. The thickness of adhesive layer 17 corresponds to the thickness of adhesive layer 2 applied on glass sheet 1 in step A of the process.

Glass sheets 1 and 16 thus prepared are now joined by calendering without bubbles in step $E_1$–$E_3$ of the process. For this purpose, front edges 20, 21 of glass sheets 1, 2 are juxtaposed ($E_1$) so that the two glass sheets form between them an angle $\alpha$ of 2° to 6° and preferably of about 3° to 4°. In this relative position, the two glass sheets 1, 16 are introduced into the nip formed by the two cylinders 22, 23.

When cylinders 22, 23 have engaged the glass sheets and the calendering operation itself has begun, the two glass sheets 1, 16 are supported ($E_2$), in an appropriate way so that the sections of the two glass sheets in front of the nip of the cylinders are separated from one another by bending and an opening interstice 5 is maintained during the entire calendering operation. During the calendering operation, an elastic bending of the glass sheets occurs over a distance B of about 20 to 40 cm depending on the thickness of the glass sheet. If the bending lines of the two glass sheets and their tangents are considered in this zone B, the tangents of the bending line of the upper glass sheet form, with the tangents of the bending line of the lower glass sheet, angles which begin at 0° in the nip of the cylinders and grow progressively until reaching the maximal value of opening angle In the final part ($E_3$) of the calendering operation, there exists only a very small opening interstice S. On the final distance of about 10 cm from back edge 24, the opening angle $\alpha$ should no longer be maintained, because there is no longer any danger of occlusion of air bubbles.

Coated glass sheets 1, 16 are joined by calendering by the pair of cylinders 22, 23 in such a way that at the output of the nip of the cylinders there is obtained a perfectly transparent pane of laminated glass without bubbles of trapped air, and it remains only to cause adhesive layer 17 to be hardened and, if applicable, adhesive layer 2. For this purpose, behind the pair of cylinders 23 is installed a UV radiation source 25 which extends over the entire width of the pane of laminated glass and with the intervention of which the adhesive layers harden. At the exit of this work station which performs step $E_1$ to $E_3$ of the process, the production of the pane of laminated glass is completed.

The conduct of the process illustrated diagrammatically in FIG. 2 is identical in its steps C, D and $E_1$ to $E_3$ with that of the process described above, so that on this point reference can be made to the preceding description. In contrast with what happened in the previously described process, in the case of the process illustrated in FIG. 2, the application of the adhesive layer and the gluing of film 28 in a step F of the process are performed at one and the same work station. Film 28 is again unwound from a feed roller 29 and passes around a coating roller 10 by means of which it is applied on glass sheet 1. Adhesive layer 2, however, in this case is not applied on glass sheet 1, but on film 28. For this purpose, the roller coating machine for the adhesive, which comprises applicator roller 4 with a smooth rubber surface and metering roller 3 of steel which rotates in the same direction as the first, is installed immediately beside coating roller 10, so that applicator roller 4 is pressed against film 28 supported by coating roller 10. Applicator roller 4 rotates in the direction of advance of the film 28 and in the direction opposite coating roller 10 so that, during its contact with film 28, an adhesive layer of uniform thickness is applied on this film 28. Behind coating roller 10, in the direction of advance of glass sheet 1, is installed a UV radiation source 14 with the intervention of which adhesive layer 2 hardens.

After turning over (turning over arrow W) of glass sheet 1 thus prepared, in the following step C of the process, glass sheet 1 is joined by calendering in step $E_1$ to $E_3$ of the process to glass sheet 16 prepared in step D of the process, as described with reference to FIG. 1.

For the practical embodiment of step $E_1$ to $E_3$ of the process, i.e. the joining by calendering of the two prepared glass sheets 1 and 16, a device whose principal elements are illustrated in FIG. 3, has proved effective. This device comprises the pair of pressing cylinders 22, 23 by means of which the two prepared glass sheets 1 and 16 are joined by calendering under an adjustable pressure, and means which assure that the opening angle $\alpha$ of 2° to 6° between these two glass sheets is maintained in front of the entry to the calendering nip. Lower glass sheet 16 is guided, upstream from the calendering nip, on a conveying path made of conveying rollers 28 and inclined at an angle $\beta$ of about 2° in relation to the conveying path which is attached at the rear of the calendering nip and is made of conveying rollers 29 or of a corresponding conveying belt. Glass sheet 16 is applied on this conveying path inclined under the effect of its own weight.

Above glass sheet 16, upper glass sheet 1 is brought to the calendering nip also on a roller conveying path. The last conveying rollers 30 of this upper conveying path, which have a relatively small diameter, are placed in a plane inclined at an angle $\gamma$. Opening interstice S between the two glass sheets 1 and 16 is also attained by a slight deformation of the two glass sheets, lower glass sheet 16 attaining the slight bending downward necessary by its own weight, while the upper glass sheet is supported in a corresponding manner at the level of its lower face. In the last section immediately in front of calendering nip 26, the support of upper glass sheet 1 is assured by a bar 32 which is secured laterally beside the glass sheets. Bar 32 is of inflexible metal and exhibits a wedge-shaped section which steadily decreases in the direction of the calendering nip. On its upper surface, it is provided with a sliding layer 23 having a low coefficient of friction which can, for example, be polytetrafluoroethylene.

When glass sheets 1, 16 are not very wide, a support of upper glass sheet 1 over its entire width is not absolutely essential. In this case, it is sufficient to provide simply small wedge-shaped sliding pads 34 on both sides, as illustrated in FIG. 4.

Figure 4:
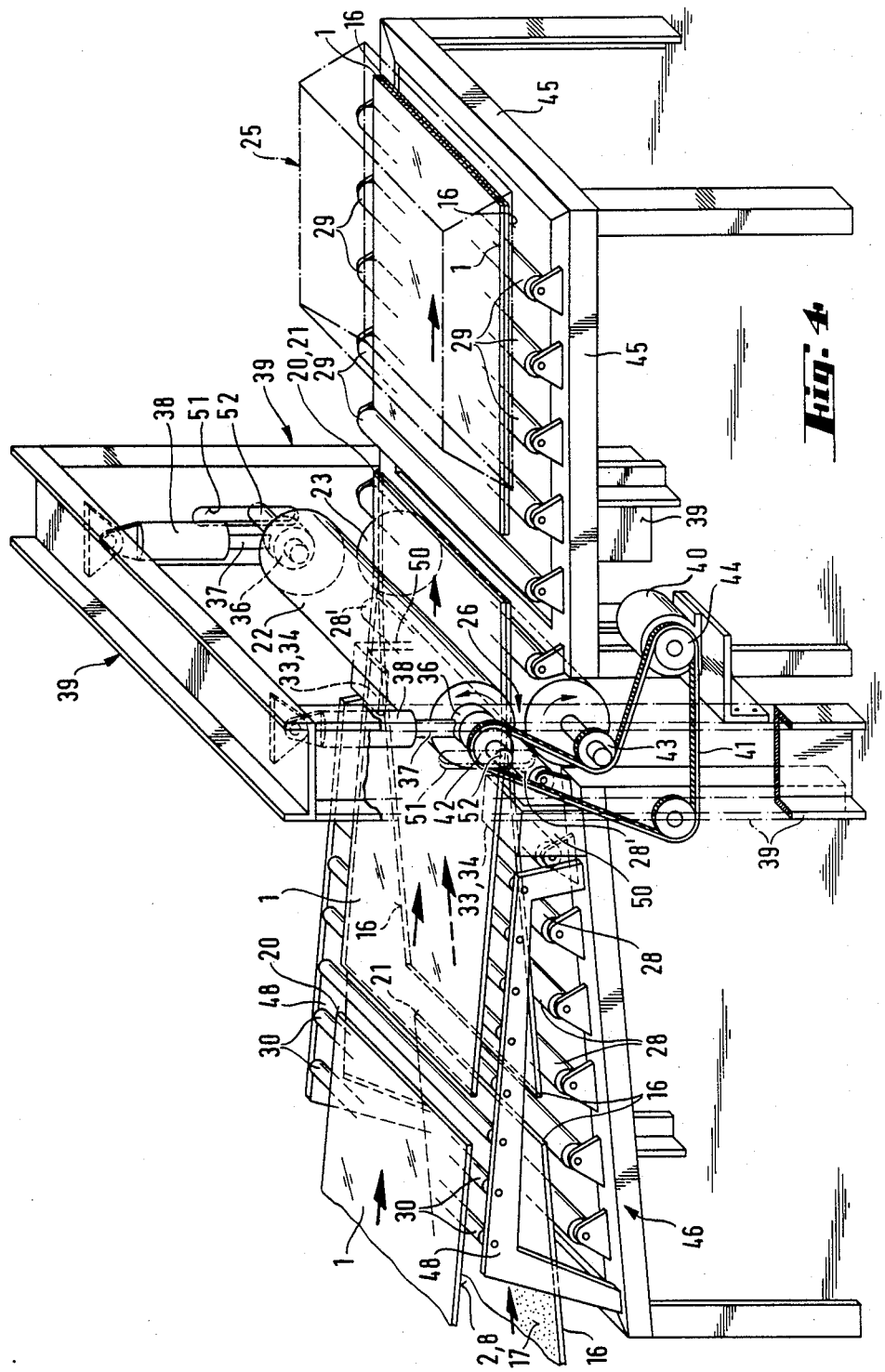
FIG. 4 is a view in overall perspective of a calendering device and of a following hardening section.

Moreover, FIG. 4 illustrates by a view in perspective once again the assembly of the installation used for the joining by final calendering of the two prepared glass sheets 1 and 16. The devices used to prepare the two glass sheets 1 and 16 to be joined by calendering, are known as such and, consequently, are not illustrated in detail.

Lower cylinder 23 of the pair of pressure cylinders is mounted on the inside of the device at such a height that its line of contact for glass sheet 16 is located in the conveying plane determined by conveying rollers 29. Upper pressure cylinder 22 is held by lateral bearings 36 which can slide in height in two vertical slides 51, 52 and are pulled with an adjustable pressure by jacks 38 by piston rods 37. Jacks 38 are fastened to a frame 39. Driving of the two pressing cylinders 22, 23 is performed by a gearmotor 40 whose rotation movement is transmitted from drive wheel 44 by a two-face toothed belt 41 to gear wheels 42 and 43 of the two cylinders 22 and 23.

Conveying rollers 29 behind the pair of cylinders 22, 23 viewed in the direction of advance of the glass sheets, are mounted on frame 45 in a horizontal plane. Conveying rollers 28 located in front of the pair of cylinders 22, 23 are mounted on frame 46 in a plane that rises slightly toward the calendering nip so that the last conveying roller 28' located immediately in front of cylinder 23 occupies the highest position.

Lateral supports 48 are mounted on frame 46 and support rollers 30 rotate in these supports and are intended to support upper glass sheet 1. In addition, slightly in front of lower pressing cylinder 23, lateral supports 50 are placed on frame 46 and sliding pads 34 are fastened there, these pads assuring, immediately upstream from the calendering nip, the support of upper glass sheet 1. These pads 34 are provided on their upper surface with a sliding covering 33, for example of polytetrafluoroethylene.

Prepared glass sheets 16 and 1 placed by hand or with suitable conveying devices on conveying rollers 28 or on support rollers 30 and each time are oriented so that their front edges are touching. Drive motor 40 for pressing cylinders 22, 23 is then switched on and the two glass sheets are driven by the pair of cylinders and are joined by calendering and transferred onto conveying rollers 29. Installed above conveying rollers 29 is source 25 of UV rays with the intervention of which the adhesive layer or layers harden. Downstream from source 25 of UV rays, the production of the pane of laminated glass is completed.

I claim:

1. A process for producing laminated glass from at least two sheets of glass and an interlayer of plastic film glued to the two sheets, comprising the steps of:
   separately applying a coherent and uniform film having a predetermined thickness of a hardenable adhesive material to each of a pair of glass sheets;
   adhering said plastic film to one of said glass sheets by calendering;
   bonding said glass sheets to one another with said plastic film therebetween via said adhesive material by calendering using a pair of cylinders while maintianing an entry opening angle of 2° to 6°.

2. Process according to claim 1, wherein the first glass sheet provided with the plastic film and the second glass sheet provided with the adhesive layer are joined by calendering maintaining an entry opening angle of 3° to 4°.

3. Process according to claim 1 or 2, wherein adhesive films are applied by means of a spraying device.

4. Process according to claim 1 or 2, wherein the adhesive films are applied by means of a roller coating device.

5. Process according to claims 1 or 2 wherein the second glass sheet is coated with adhesive on a face thereof which is oriented upward, and the first glass sheet is provided with the plastic film on a face thereof which is oriented downward, and wherein said sheets are introduced into the nip of the cylinders in an orientation substantially horizontal.

6. Process according to claim 5, wherein the first glass sheet provided with the plastic film is supported by rollers in contact with the plastic film, while the second glass sheet coated with adhesive keeps its position under the effect of its own weight.

7. Process according to claim 5 wherein the support of the first glass sheet provided with the plastic film is provided by rigid bars or support elements on which the plastic film slides.

8. A device for producing laminated glass from at least two sheets of glass and an interlayer of plastic film glued to the two sheets, comprising:
   a pair of driven pressure calendering cylinders;
   means for separately applying a coherent and uniform film having a predetermined thickness of a hardenable adhesive to each of a pair of glass sheets; and
   means for conveying said glass sheets to said cylinders, said conveying means comprising:
   (a) conveying rollers for supporting a glass sheet having an upper face coated with the adhesive, and
   (b) support elements placed above said conveying rollers for supporting and conveying a glass sheet having a lower face covered with a plastic film,
   wherein said conveying rollers form a first plane and said support elements form a second plane, said first and second planes intersecting at a nip of said cylinders with an angle of 2° to 6°.

9. Device according to claim 8 wherein at least one of said support elements is positioned immediately upstream of said nip.

10. Device according to claim 9, wherein the support elements have the form of a sliding bar which extends continuously over the entire width of the glass sheet.

11. Device according to claim 9, wherein the support elements have the form of sliding pads which support a glass sheet at its two edges.

12. Device according to claim 10 or 11, wherein the support elements are provided on their upper surface, which is in sliding contact with the plastic film, with a layer exhibiting good sliding properties.

13. Device according to claim 12, wherein the layer which exhibits good sliding properties is of polytetrafluoroethylene.

* * * * *